United States Patent
McSwiggan

(10) Patent No.: US 11,451,503 B2
(45) Date of Patent: Sep. 20, 2022

(54) SYSTEM AND METHOD FOR TEXT ANALYSIS AND ROUTING OF WRITTEN COMMUNICATION

(71) Applicant: Verint Americas Inc., Alpharetta, GA (US)

(72) Inventor: Stephen McSwiggan, Scotland (GB)

(73) Assignee: Verint Americas Inc., Alpharetta, GA (US)

( * ) Notice: Subject to any disclaimer, the term of this patent is extended or adjusted under 35 U.S.C. 154(b) by 217 days.

(21) Appl. No.: 15/645,707

(22) Filed: Jul. 10, 2017

(65) Prior Publication Data

US 2019/0014067 A1    Jan. 10, 2019

(51) Int. Cl.
*G06F 15/16* (2006.01)
*H04L 51/214* (2022.01)
*G06F 40/279* (2020.01)

(52) U.S. Cl.
CPC .......... *H04L 51/214* (2022.05); *G06F 40/279* (2020.01)

(58) Field of Classification Search
CPC ............................ H04L 51/14; G06F 17/2765
USPC ........................................................ 709/206
See application file for complete search history.

(56) References Cited

U.S. PATENT DOCUMENTS

| | | | |
|---|---|---|---|
| 2010/0100412 A1* | 4/2010 | Cases ..................... | G06Q 10/10 705/7.27 |
| 2011/0161445 A1* | 6/2011 | Nelke ..................... | H04L 51/04 709/206 |
| 2013/0282844 A1* | 10/2013 | Logan ................... | H04L 67/535 709/204 |
| 2015/0195406 A1* | 7/2015 | Dwyer .................. | G06F 40/279 379/265.07 |

\* cited by examiner

*Primary Examiner* — Suraj M Joshi
*Assistant Examiner* — Joel Mesa
(74) *Attorney, Agent, or Firm* — Christopher M. Scherer; DeWitt LLP

(57) ABSTRACT

The present invention allows text analysis and routing of written communications. The system intercepts incoming written communications for analysis by a text analytics service (TAS) software module. The TAS module analyzes the communication to generate communication metadata, which is used by a smart routing engine to route the communication to an appropriate party. This ensures that the ultimate recipient of the communication is capable of effective interaction with the sender and reduces the time required for a communication to be acted upon.

18 Claims, 4 Drawing Sheets

SYSTEM AND METHOD FOR TEXT ANALYSIS AND ROUTING OF WRITTEN COMMUNICATION

FIELD

The present disclosure is directed to a method for computer analysis, specifically a method of analyzing text in an incoming written communication and routing the written communication based on the analysis.

BACKGROUND

Contact centers receive large volumes of written (i.e., textual and non-voice) communication from customers. Distributing this workload amongst the customer service representatives (CSRs) as efficiently as possible reduces the time required to reply the written communication. This is typically achieved by crude routing procedures such as analyzing the "To" address of an email to route the communication to an appropriate department, or searching for specific keywords in the "Subject" line of an email or the entries in a pre-filled chat request form.

As a result of such exceptionally simplistic handling based on limited understanding of the content, the written communication is often provided to a CSR with a non-optimal skill set. In a worst-case scenario, the initial CSR cannot handle any of the required tasks, requiring manual reassignment to a more appropriate CSR and resulting in delays for completion of the work or response to the written communication.

There is an unmet need in the art for a system capable of automatically analyzing text in an incoming written communication and routing the written communication to an appropriate CSR based on the analysis.

SUMMARY

An exemplary embodiment of the present application is a method for text analysis and routing of written communication. An incoming written communication from outside a customer engagement center (CEC) system is received and analyzed using a text analytics service (TAS) software module in a TAS unit. Based on the analysis of the TAS software module, the TAS software module generates communication metadata for the written communication, which the TAS unit passes, along with the written communication, to a smart routing engine (SRE). The SRE performs an analysis of the communication metadata using a SRE software module. Based on the analysis, the SRE designates at least one of a CSR, CSR group, a queue, or a queue group to receive the written communication and passes the written communication for display on a CEC desktop.

Another exemplary embodiment of the present application is a system for text analysis and routing of written communication. The system includes a processor and a non-transitory computer readable medium programmed with computer readable code that upon execution by the processor causes the processor to execute the above-mentioned method for text analysis and routing of written communication.

Another exemplary embodiment of the present application is a non-transitory computer readable medium programmed with computer readable code that upon execution by a processor causes the processor to execute the above-mentioned method for text analysis and routing of written communication.

The objects and advantages will appear more fully from the following detailed description made in conjunction with the accompanying drawings.

BRIEF DESCRIPTION OF THE DRAWING(S)

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

CEC systems allow CSRs to engage with customers in a controlled manner. By applying effective automated analysis of incoming written communication, the CEC system can allow an organization to achieve several key benefits. First, more effective routing of the written communication will decrease the time required for both handling and eventual resolution. Second, routing the communication to the most-qualified personnel will increase both the likelihood of rapid resolution and customer satisfaction.

In embodiments, it is desirable for the system to analyze the written communication to create metadata and then route the written communication according to predetermined criteria. This allows the system to ensure effective routing of written communication to parties capable of effective management. In an embodiment, it is desirable to provide the metadata for review as well as the written communication. In another embodiment, it is desirable to allow modification of the predetermined criteria. In yet another embodiment, it is desirable to allow storage of the written communication and/or the communication metadata at various points in the process.

Figure 1:
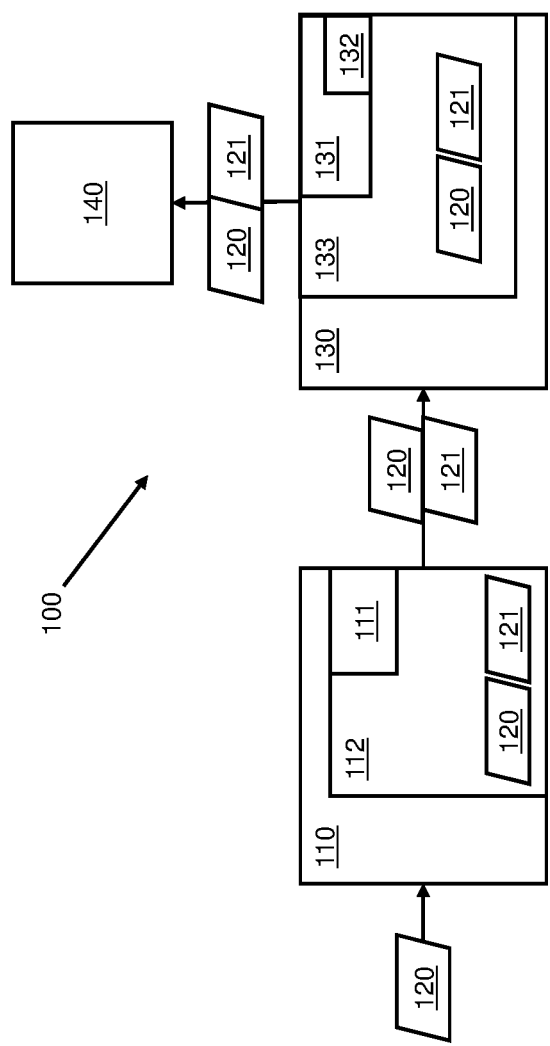
FIG. 1 depicts an exemplary embodiment of a customer engagement center system for text analysis and routing of written communication.

FIG. 1 depicts an exemplary embodiment of CEC system 100 for text analysis and routing of written communication. CEC system 100 includes a TAS unit 110 having a TAS software module 111 and an optional TAS storage 112. TAS unit 110 may be a processor or a combination of a processing system and a storage system. TAS unit 110 receives written communications 120 from outside of CEC system 100 and analyzes them using TAS software module 111 to generate communication metadata 121. Written communication 120 may be email, an online posting, a direct message from a customer, a communication from a third party, a message from a customer forwarded by a third party, or any other written communication. Optionally, TAS unit 110 may also pass a copy of written communication 120 and/or communication metadata 121 to internal or external TAS storage 112 for permanent or temporary storage.

Communication metadata 121 may include, but is not limited to, the sentiment, tone, and/or word choice of the sender, intent and/or meaning of the correspondence, presence of threats, and/or a list of business entities referenced by written communication 120. By way of non-limiting example, the list of business entities referenced by written communication 120 may include at least one of a policy, an account, a customer, an involved or associated third party, and/or other parties identified in written communication 120. In certain embodiments, the intent of the correspondence is expressed as a list of action points ordered by importance or urgency.

CEC system 100 also includes a SRE 130 having a SRE software module 131. SRE 130 may be a processor or a combination of a processing system and a storage system. SRE 130 receives written communication 120 with communication metadata 121 from TAS unit 110 and analyzes it using SRE software module 131 to route written communication 120 based on predetermined criteria 132 within SRE software module 131. Optionally, SRE 130 may also route communication metadata 121 to the same destination or a different destination from written communication 120. Optionally, SRE 130 may also pass a copy of written communication 120 and/or communication metadata 121 to internal or external SRE storage 133 for permanent or temporary storage. Stored written communications 120 and/or communication metadata 121 may allow large-scale analysis of communications traffic and trends.

Predetermined criteria 132 include rules conditioned on communication metadata 121, CSR or CSR group availability, CSR or CSR group workload, and CSR or CSR group skills. Predetermined criteria 132 may be dynamically updated by a CSR or another party as any of the associated rules change. Depending on communication metadata 121 and predetermined criteria 132, SRE 130 may route written communication 120 to a specific CSR, a group of CSRs, a specific queue, or a group of queues. By way of non-limiting example, if written communication 120 is from a specific high-value customer, it may be routed to a senior CSR to ensure the most rapid, effective response possible. By way of further non-limiting example, if written communication 120 includes a physical threat against a business location, it may be routed to a security queue for immediate review and analysis.

CSRs may be identified or grouped by level of authority or skill, skill set, product or service line, department, assigned customers or accounts, prior customer interactions, any other quality, or any combination of qualities. Queues and queue groups may be associated with a level of urgency or importance, with one or more specific issues, types of issue, products, services, product lines, service lines, customers, accounts, departments, or groups of departments, any other quality, or any combination of qualities. CSR groups and queue groups may be predetermined or created and updated dynamically to fit current or anticipated needs. By way of non-limiting example, a predetermined CSR group may include all CSRs of a given authority level. By way of further non-limiting example, a dynamic queue group may include queues for a large, very important customer and a specific time-limited issue; this queue group may be dissolved after the time to resolve the issue has expired.

CEC system 100 also includes at least one CEC desktop 140 used by the CSR for viewing written communications 120 and optionally communication metadata 121. CEC desktop may also receive input for updating predetermined criteria 132.

Figure 2A:
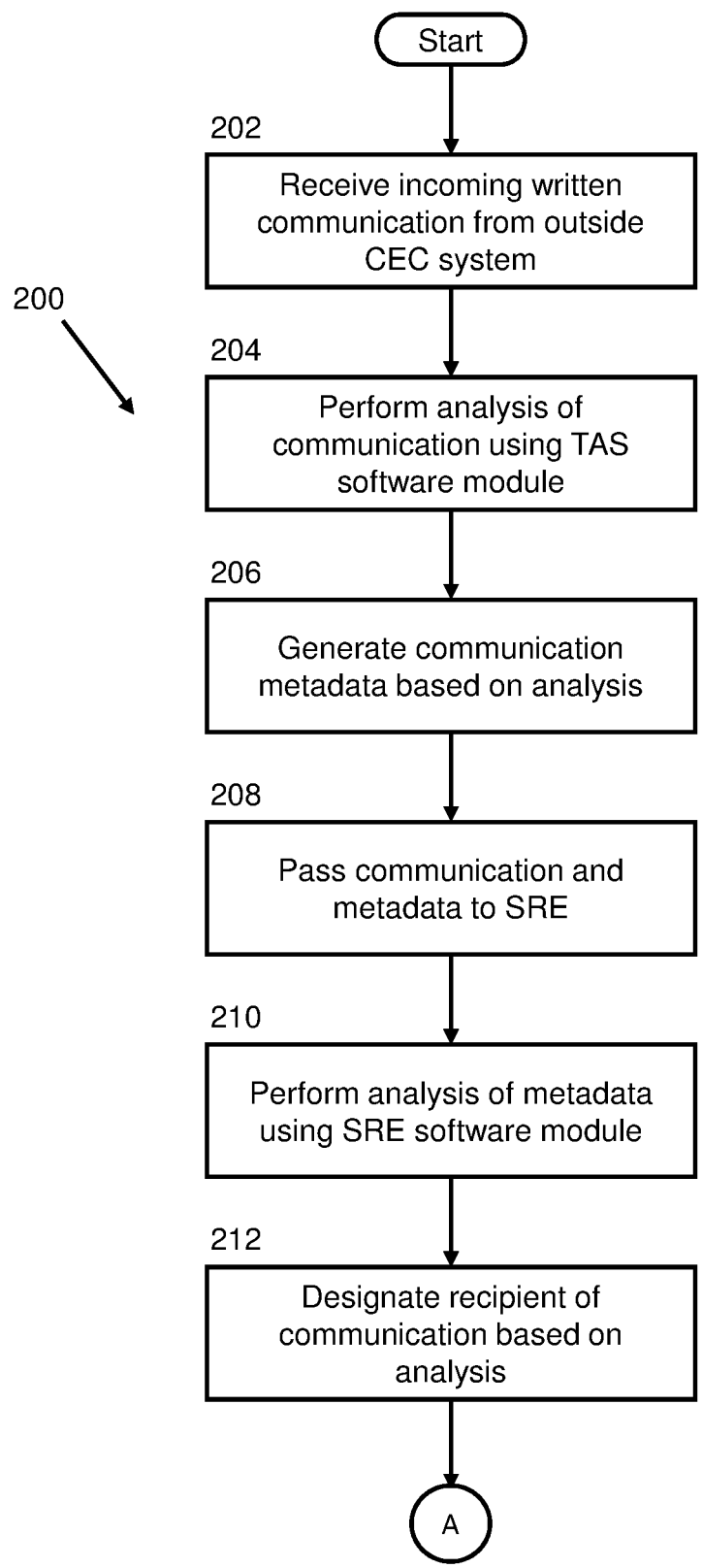
FIGS. 2a and 2b depict a flowchart of an exemplary embodiment of a method for text analysis and routing of written communication.
Figure 2B:
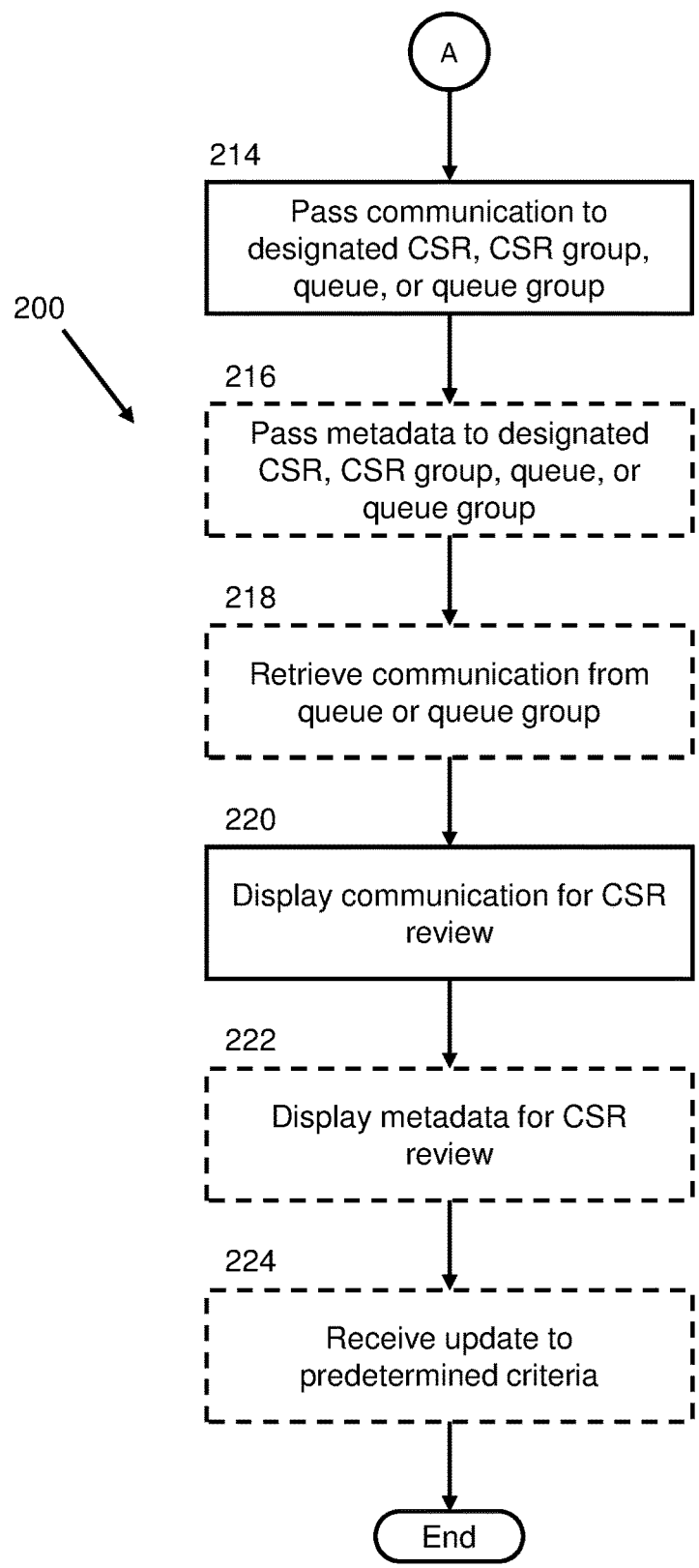

FIGS. 2a and 2b depict a flowchart of an exemplary embodiment of method 200 for text analysis and routing of written communication.

In step 202, the TAS unit receives an incoming written communication from outside the CEC system.

In step 204, the TAS unit performs an analysis of the written communication using the TAS software module. The analysis may evaluate the written communication's message content, existing attached metadata, header data, and attachments.

In step 206, the TAS unit generates communication metadata for the written communication based on the analysis of step 204.

In step 208, the TAS unit passes the written communication and the associated communication metadata to a SRE. Optionally, the TAS unit may also pass the written communication and/or associated communication metadata to TAS storage.

In step 210, the SRE performs an analysis of the communication metadata using a SRE software module. The analysis is based on predetermined criteria in the SRE software module.

In step 212, the SRE designates a CSR, CSR group, a queue, or a queue group to receive the written communication based on the analysis of step 210.

In step 214, the SRE passes the written communication to the designated CSR, CSR group, queue, or queue group from step 212. Optionally, the SRE may also pass the written communication to SRE storage.

In optional step 216, the SRE passes the communication metadata to the designated CSR, CSR group, queue, or queue group from step 212 and/or to another party. This step may occur simultaneously with step 214. Optionally, the SRE may also pass the communication metadata to SRE storage.

In optional step 218, the CSR retrieves the written communication from the queue or one of the queues in the queue group.

In step 220, the CEC desktop displays the written communication for CSR review.

In optional step 222, the CEC desktop displays the communication metadata for CSR review. In certain embodiments, this step may occur before step 220.

In optional step 224, the SRE receives an update to the predetermined criteria from the CSR or another party. In various embodiments, this step may occur before or after any other step in method 200.

Figure 3:
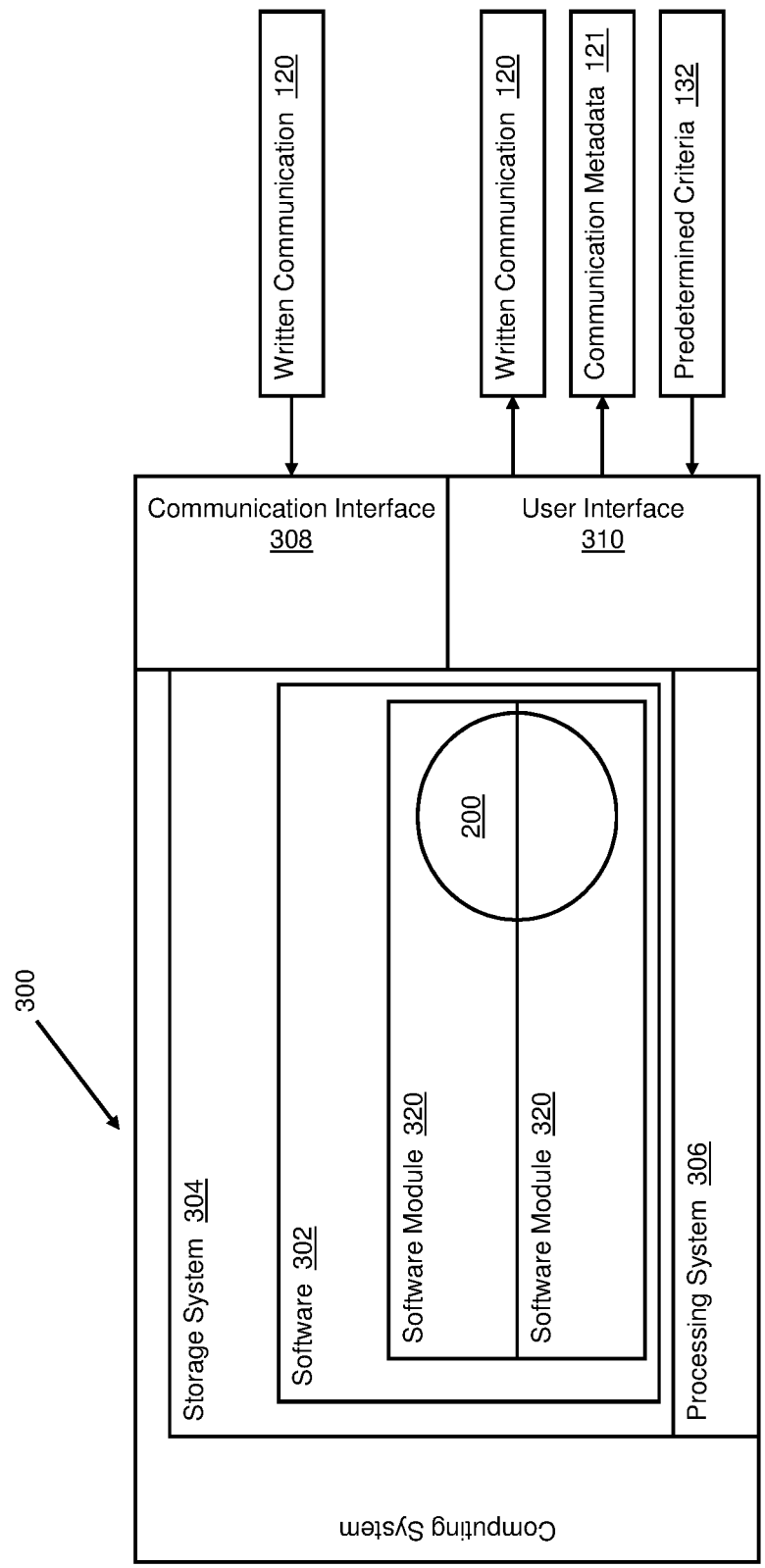
FIG. 3 depicts an exemplary embodiment of a system for text analysis and routing of written communication.

FIG. 3 depicts an exemplary embodiment of system 300 for text analysis and routing of written communication. System 300 is generally a computing system that includes a processing system 306, a storage system 304, software 302, a communication interface 308, and a user interface 310. Processing system 306 loads and executes software 302 from the storage system 304, including a software module 320. When executed by computing system 300, software module 320 directs the processing system 306 to operate as described in herein in further detail in accordance with the method 200.

Computing system 300 includes two software modules 320 for performing the functions of TAS software module 111 and/or SRE software module 131. Although computing system 300 as depicted in FIG. 3 includes two software modules 320 in the present example, it should be understood that one or more modules could provide the same operation.

Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or subsystems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other data. Storage system 304 can be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

User interface 310 can include one or more CEC desktops 140, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display written communications 120, communication metadata 121, CEC desktop 140, or another interface further associated with embodiments of the system and method as disclosed herein. Speakers, printers, haptic devices and other types of output devices may also be included in the user interface 310. A CSR or other staff can communicate with computing system 300 through the user interface 310 in order to view written communication 120 or communication metadata 121, update predetermined criteria 132, enter client input, manage an interaction, or any number of other tasks the CSR or other staff may want to complete with computing system 300.

As described in further detail herein, computing system 300 receives and transmits data through communication interface 308. In embodiments, the communication interface 308 operates to send and/or receive data, such as, but not limited to, written communication 120 to/from other devices and/or systems to which computing system 300 is communicatively connected, and to receive and process client input, as described in greater detail above. The client input can include written communication 120, details about a request, work order or other set of information that will necessitate an interaction between the client and the agent. Client input may also be made directly to the CSR, as described in further detail above.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for text analysis for routing of written communications to a customer service agent, comprising:

receiving a written communication from outside a customer engagement center system;

in a text analytics service software module on a text analytics service unit, generating a sentiment of the written communication, a tone of the written communication, a meaning of the written communication, an intent of the written communication, and a threat indication, based on a textual analysis of content of the incoming written communication, wherein the threat indication is an indication of a presence of threats in the written communication, further wherein the intent of the written communication is a list of action points ordered by importance;

passing the written communication and the generated sentiment, the generated tone, the generated meaning, the generated intent, and the generated threat indication from the text analytics service unit to a smart routing engine;

analyzing, by the smart routing engine, the generated sentiment, the generated tone, the generated meaning, the generated intent, the generated threat indication, and a set of predetermined criteria to assign a customer service representative to receive the incoming written communication, wherein the predetermined criteria include roles conditioned upon customer service representative availability, customer service representative workload, and customer service representative skills;

assigning, by the smart routing engine, the customer service representative to the incoming written communication;

transferring the written communication from the smart routing engine to the customer service representative;

transferring the generated sentiment, the generated tone, the generated meaning, the generated intent, and the generated threat indication to the customer service representative;

displaying the written communication to the customer service representative on a customer engagement ceenter desktop; and displaying the generated sentiment, the generated tone, the generated meaning, the generated intent, and the generated threat indication to the customer service representative on the customer engagement center desktop.

2. The method of claim 1, wherein the customer service representative assigned retrieves the written communication from a queue or queue group before reviewing the written communication on the customer engagement center desktop.

3. The method of claim 1, wherein the smart routing engine passes the generated sentiment, the generated tone, the generated meaning, the generated intent, and the generated threat indication simultaneously with the written communication.

4. The method of claim 1, wherein the customer engagement center desktop displays the generated sentiment, the generated tone, the generated meaning, the generated intent, and the generated threat indication before the customer engagement center desktop displays the written communication.

5. The method of claim 1, wherein the smart routing engine passes the generated sentiment, the generated tone, the generated meaning, the generated intent, and the generated threat indication to a party other than the customer service representative assigned.

6. The method of claim 1, further comprising the text analytics service unit passing a copy of the written communication to a text analytics service storage.

7. The method of claim 1, further comprising the text analytics service unit passing a copy of the generated sentiment, the generated tone, the generated meaning, the generated intent, and the generated threat indication to a text analytics service storage.

8. The method of claim 1, further comprising the smart routing engine passing a copy of the written communication to a smart routing engine storage.

9. The method of claim 1, further comprising the smart routing engine passing a copy of the generated sentiment, the generated tone, the generated meaning, the generated intent, and the generated threat indication to a smart routing engine storage.

10. The method of claim 1, further comprising the smart routing engine receiving an update to the predetermined criteria.

11. A system for text analysis for routing of written communications to a customer service agent, comprising:
a processor; and
a non-transitory computer readable medium programmed with computer readable code that upon execution by the processor causes the processor to:
receive a written communication from outside a customer engagement center system,
in a text analytics service software module on a text analytics service unit, generate a sentiment of the written communication, a tone of the written communication, a meaning of the written communication, an intent of the written communication, and a threat indication, wherein the threat indication is an indication of a presence of threats in the written communication, further wherein the intent of the written communication is a list of action points ordered by importance,
pass the written communication and the generated sentiment, the generated tone, the generated meaning, the generated intent, and the generated threat indication from the text analytics service unit to a smart routing engine,
analyze, by the smart routing engine, the generated sentiment, the generated tone, the generated meaning, the generated threat indication, and a set of predetermined criteria to assign a customer service representative to receive the incoming written communication, wherein the predetermined criteria include rules conditioned upon customer service representative availability, customer service representative workload, and customer service representative skills,
assign, by the smart routine' engine, the customer service representative to the incoming written communication,
transfer the written communication from the smart routing engine to the assigned customer service representative,
transfer the generated sentiment, the generated tone, the generated meaning, the generated intent and the generated threat indication to the customer service representative,
display the written communication to the customer service representative on a customer engagement center desktop; and
display the generated sentiment, the generated tone, the generated meaning, the generated intent, and the generated threat indication to the customer service representative on the customer engagement center desktop.

12. The system of claim 11, wherein the text analytics service software module is programmed to evaluate at least one of a message content, existing attached metadata, header data, and attachments for the written communication.

13. The system of claim 11, wherein the text analytics service software module generates communication metadata based on text analytics of a message content of the written communication, wherein the communication metadata is at least one of a word choice of a sender or a list of business entities referenced by the written communication.

14. The system of claim 13, wherein the smart routing engine is programmed to evaluate the communication metadata based on the predetermined criteria in the smart routing engine.

15. The system of claim 14, wherein the predetermined criteria are updateable.

16. The system of claim 11, wherein the at least one of the customer service representative retrieves the written communication from a groups or queue groups before reviewing the written communication the customer engagement center desktop.

17. The system of claim 16, wherein at least one of the groups or queue groups is created and updated dynamically.

18. A non-transitory computer readable medium programmed with computer readable code that upon execution by a processor causes the processor to:
receive a written communication from outside a customer engagement center system,
using a text analytics service software module on a text analytics service unit, generate a sentiment of the written communication, a tone of the written communication, a meaning of the written communication, an intent of the written communication, and a threat indication, wherein the threat indication is an indication of a presence of threats in the written communication, further wherein the intent of the written communication is a list of action points ordered by importance,
pass the written communication and the generated sentiment, the generated tone, the generated meaning, the generated intent, and the generated threat indication from the text analytics service unit to a smart routing engine,
analyzing, by the smart routing enoine, the generated sentiment, the generated tone, the generated meaning, the generated intent, the generated threat indication, and a set of predetermined criteria to assign a customer service representative to receive the incoming written communication, wherein the predetermined criteria include rules conditioned upon customer service representative availability, customer service representative workload, and customer service representative skills, assign, by the smart routing engine, the customer service representative to the incoming written communication, transfer the written communication from the smart routing engine to the customer service representative, transfer the generated sentiment, the generated tone, the generated meaning, the generated intent, and the generated threat indication to the customer service representative, display the written communication to the customer service representative on a customer engagement center desktop, and display the generated sentiment, the generated tone, the generated meaning, the generated intent, and the generated threat indication to the customer service representative on the customer engagement center desktop.

\* \* \* \* \*